United States Patent [19]
> Watts

[11] Patent Number: 4,577,698

[45] Date of Patent: Mar. 25, 1986

[54] VARIABLE WIDTH TWO-WAY GANG PLOW

[76] Inventor: Glen A. Watts, Rte. 3, Box 120, McMinnville, Oreg. 97129

[21] Appl. No.: 572,677

[22] Filed: Jan. 20, 1984

[51] Int. Cl.$^4$ .............................................. A01B 3/42
[52] U.S. Cl. .................................... 172/225; 172/647
[58] Field of Search ............... 172/647, 646, 224, 225, 172/283, 220, 221

[56] References Cited

U.S. PATENT DOCUMENTS

| | | | |
|---|---|---|---|
| 3,554,294 | 1/1971 | Morkoski | 172/225 |
| 3,848,678 | 11/1974 | Dowdeswell | 172/225 |
| 3,918,528 | 11/1975 | Kinzenbaw | 172/218 |
| 3,920,080 | 11/1975 | Vassiliou | 172/647 |
| 4,049,063 | 9/1977 | Dietrich | 172/283 |
| 4,098,346 | 7/1978 | Stanfill | 172/283 |
| 4,186,806 | 2/1980 | Ward | 172/283 |
| 4,415,040 | 11/1983 | Salva | 172/225 |

FOREIGN PATENT DOCUMENTS 1473287  2/1967  France .......................... 172/224

*Primary Examiner*—Richard J. Johnson
*Attorney, Agent, or Firm*—Oliver D. Olson

[57] ABSTRACT

A two-way gang plow is provided with a main support frame arranged for connection to a conventional three point hitch of a tractor. The forwardmost pair of plow bottoms are secured in fixed position on a portion of the roll-over plow frame that is fixed against angular adjustment relative to the longitudinal direction of movement of the plow by the tractor. The pairs of plow bottoms trailing the forwardmost pair are mounted on a plow frame that is pivoted to the fixed roll-over frame section for angular adjustment relative to the longitudinal axis of the main frame and hence the direction of the movement of the tractor. The pairs of plow bottoms rearwardly of the forward most pair also are mounted on the angularly adjustable frame for pivotal movement relative to said frame, for adjusting the land sides of the plow bottoms relative to said angularly adjustable frame. All of said trailing pairs of plow bottoms are interconnected pivotally by a link connected pivotally to the fixed portion of the roll-over frame. Accordingly, angular adjustment of the plow bottom support frame relative to the longitudinal direction of movement of the tractor maintains all of the land sides of the plow bottoms parallel to the direction of movement of the tractor, whereby to effect adjustment of the lateral spacing between adjacent land sides and accommodate use of the plow in a variety of types and conditions of soil.

5 Claims, 4 Drawing Figures

VARIABLE WIDTH TWO-WAY GANG PLOW

BACKGROUND OF THE INVENTION

This invention relates to two-way gang plows, and more particularly to a two-way gang plow in which the plurality of plow bottom pairs are capable of being adjusted simultaneously to vary the lateral spacing between the land sides of adjacent plow bottoms.

Some crops are harvested with heavy equipment pulled by tractors and trucked out of the field during the times the soil is moist. Such traffic results in packing of the soil to much greater density than is the natual soil. On the other hand, other crops such as wheat that may be raised on the same field the next year have no heavy traffic while the ground is moist and therefore does not become packed. Many farm areas raise both types of crops each year, and therefore it would be advantageous if the plow bottoms could be adjusted to vary the spacing between the land sides of adjacent bottoms, to accommodate plowing of fields of packed and unpacked soil with the same plow and tractor.

However, two-way gang plows of the known prior art are not adjustable in the above manner and thus require a farmer to purchase a small plow capable of being pulled through packed soil with an efficient tractor. On the other hand, such a small plow is wasteful of time and fuel if used for plowing large fields of unpacked soil. Accordingly, the farmer must also purchase a large plow for use on large fields of unpacked soil.

SUMMARY OF THE INVENTION

In its basic concept, this invention provides a two-way gang plow in which the plurality of plow bottom pairs are adjustable simultaneously to vary the lateral spacing between the land sides of adjacent plow bottoms.

It is the principal objective of this invention to provide a two-way gang plow that overcomes the aforementioned limitations and disadvantages of the two-way gang plows of the prior art.

Another object of this invention is the provision of a two-way gang plow of the class described which is capable of plowing fields of packed and unpacked soil with maximum efficiency with the same tractor, simply by varying the spacing between the land sides of adjacent plow bottoms.

A further object of this invention is to provide a two-way gang plow of the class described which is of simplified and therefore economical construction.

The foregoing and other objects and advantages of this invention will appear from the following detailed description, taken in connection with the accompanying drawings of preferred embodiments.

DESCRIPTION OF THE PREFERRED EMBODIMENTS

Figure 1:
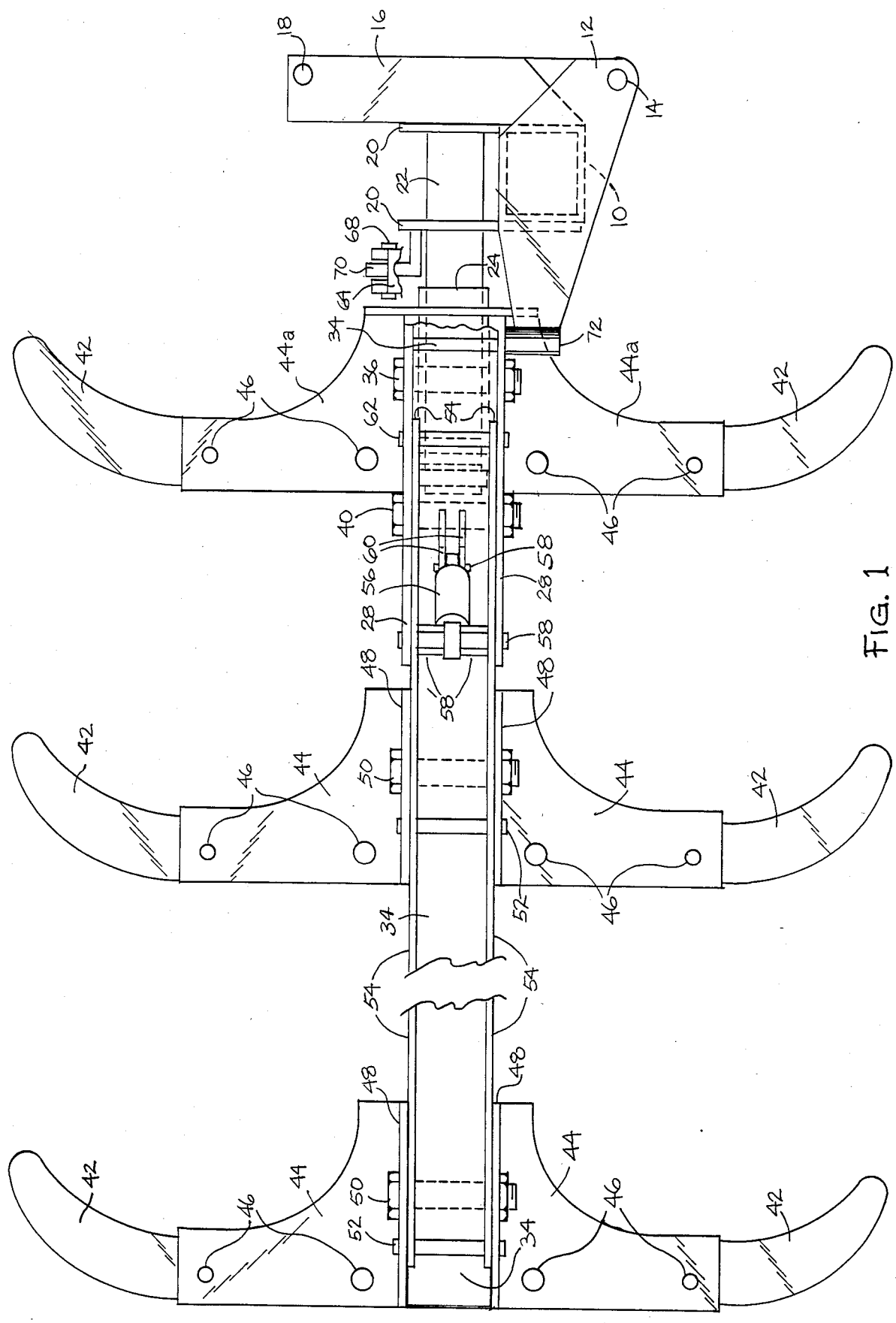
FIG. 1 is a foreshortened side elevation of a two-way gang plow frame assembly with a three point type tractor mounting and with the plow bottoms removed for clarity and with the roll over cylinder assembly broken away to disclose other details of structure embodying the features of this invention.
Figure 2:
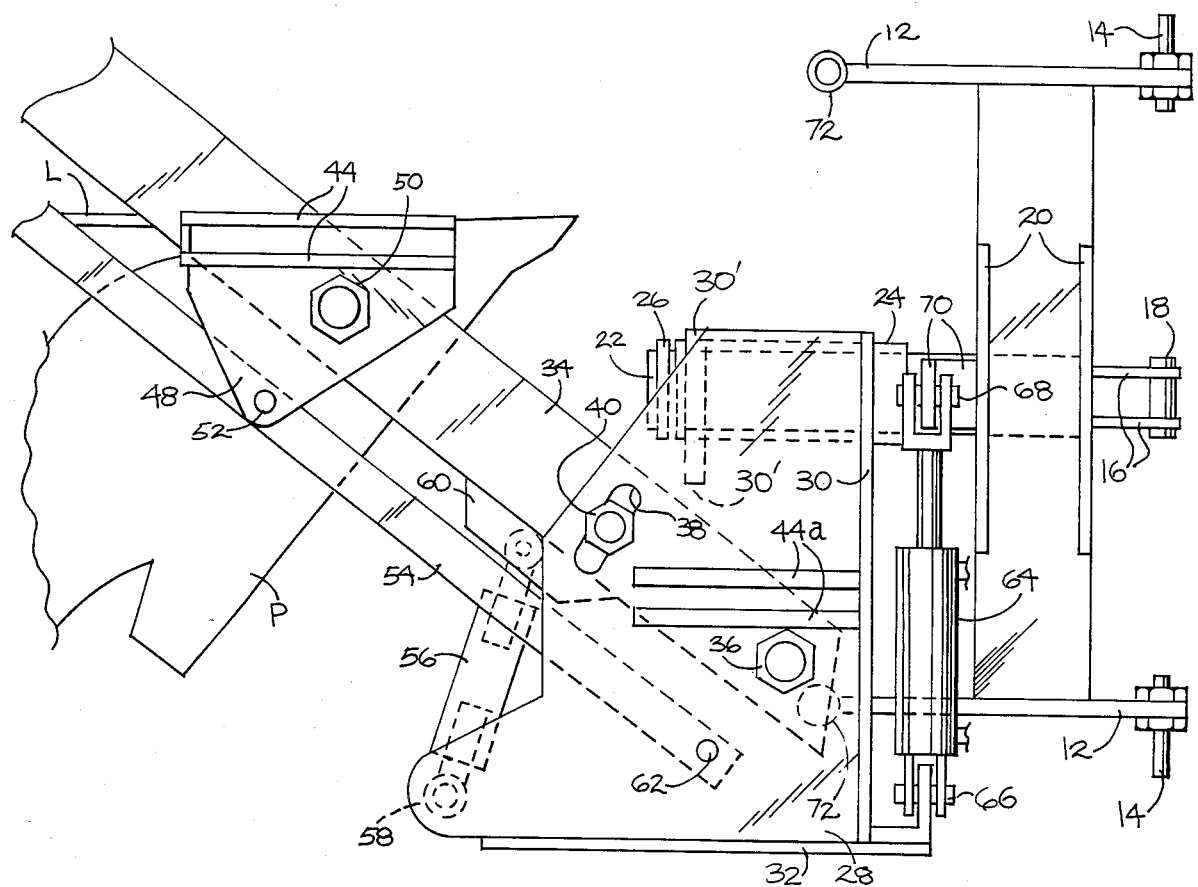
FIG. 2 is a fragmentary plan view as viewed from the top in FIG. 1.
Figure 3:
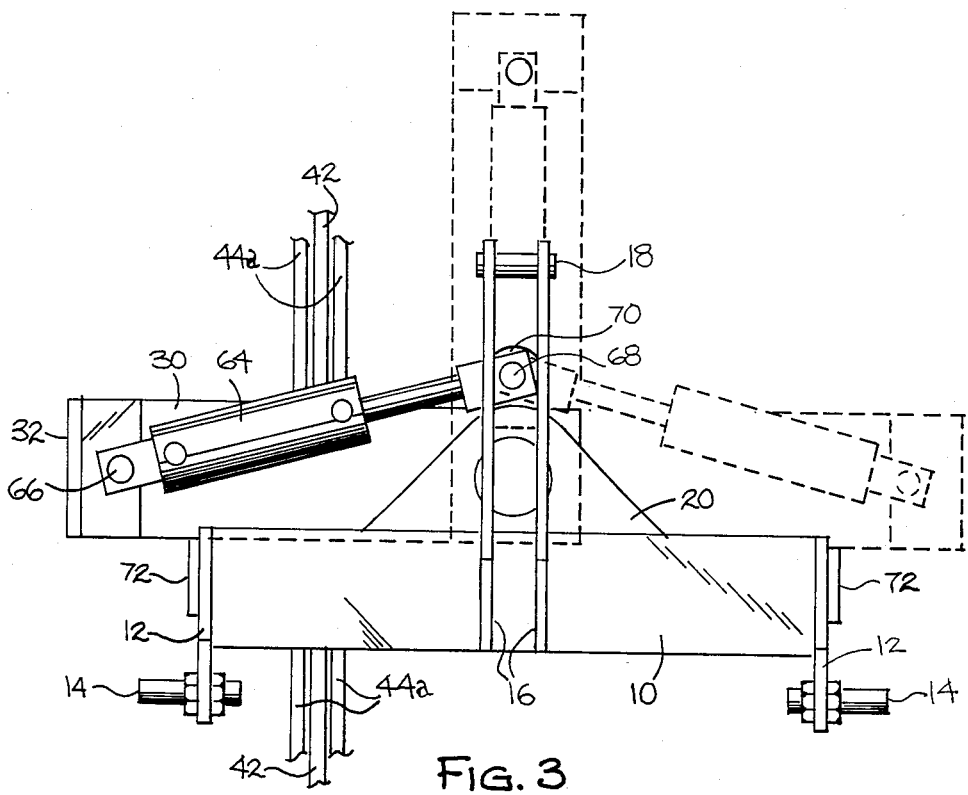
FIG. 3 is a fragmentary front elevation as viewed from the right in FIG. 2.

In the embodiment illustrated in FIGS. 1-3 of the drawings, the main frame includes a transverse beam 10 provided at its ends with forwardly extending arms 12 fitted with stub shafts 14 for pivotal attachment to lower levers of a three point hitch of a tractor.

A pair of spaced plates 16 extend upwardly from the front side of beam 10 and are fitted with a stub shaft 18 adjacent the upper ends of the plate for pivotal attachment to an upper center lever of a three point hitch of a tractor. A pair of flanges 20 extend upwardly from the front and rear sides of the beam 10 and are provided with aligned openings for reception therethrough of a relatively short length of shaft 22. This shaft is secured to the flanges and extends rearwardly of the beam 10. The frame serves to support a plow frame assembly for roll-over rotation between right and left operating positions. The plow frame assembly includes a sleeve 24 mounted rotatably on the shaft 22. A removable retainer collar 26 on the rear end of the shaft serves to keep the sleeve in position on the shaft.

A pair of parallel plow bottom frame support plates 28 are disposed on opposite sides of the sleeve and extend laterally from the sleeve. Front wall 30, rear partial wall 30' and outer end wall 32 are secured to the plates and sleeve to maintain the spacing between them.

An elongated plow bottom support frame beam 34 extends from between the plates 28 angularly rearward relative to the longitudinal axis of the shaft 22 and sleeve 26. The beam is secured to the plates 28 for pivotal movement relative thereto, by pivot bolt 36. A slot 38 in each of the plates 28 freely receives a locking bolt 40 therethrough and a nut on the bolt serves to clamp the plates releasably to beam 34. The head of the screw 40 is arranged to engage the outer surface of the plate 28 to releasably clamp the beam to the plate in any desired position of angular adjustment of the beam.

The beam 34 serves to support a plurality of pairs of plow bottoms P at longitudinally spaced intervals along the length of the beam and to opposite sides thereof. Moreover, in accordance with this invention, means is provided for pivoting the beam-mounted plow bottoms simultaneously and to the same degree, in order to vary the spacing between the land sides L of adjacent plow bottoms. This arrangement accommodates the plowing of a variety of types and conditions of soil with the same tractor. For example, the land sides may be moved closer together for plowing compacted or otherwise heavy or dense soil and farther apart for plowing uncompacted, dry or otherwise light soil.

In the embodiment illustrated in FIGS. 1-3, the shank 42 (FIG. 1) of each plow bottom is received removably between a pair of mounting flanges 44 and secured detachably by bolts extended through aligned openings 46 in the flanges and shank. Each pair of flanges 44 project at right angles from a flange plate 48 which is secured pivotally to the support beam 34 by a pivot bolt 50. Each bolt serves to secure the flange plates 48 of an associated pair of plow bottoms to opposite sides of the beam. The land side L of each plow bottom extends parallel to the flanges 44, as illustrated in FIG. 2.

The forwardmost pair of plow bottoms are mounted removably between associated pairs of mounting flanges 44a secured to and projecting laterally outward from the plates 28. The flanges are oriented perpendicular to the transverse dimension of the beam 10, so that the land sides of the associated front pair of plow bottoms extend parallel to the direction of movement of the tractor, i.e. parallel to the longitudinal axis of main frame tube 22.

The flange plates 48 project laterally beyond the beam 34, and each pair of flange plates is interconnected by a pin 52 for simultaneous pivotal movement about its common pivot bolt 50. The pins 52 associated with all beam-supported pairs of flange plates are interconnected by tie rods 54, whereby all of said flange plates are caused to pivot simultaneously and to the same degree.

Means is provided for adjusting the plow bottom support beam 34 angularly relative to the longitudinal axis of the main frame shaft 22, and hence relative to the direction of movement of the tractor over the ground being plowed. In the embodiment illustrated in FIGS. 1-3, the adjusting means is in the form of a turnbuckle 56. It is connected pivotally at one end to a shaft 58 secured to and extending between the plates 28. Spacer sleeves 58′ serve to center the turnbuckle connection midway between the ends of the shaft 58. The turnbuckle is connected at the opposite end pivotally, as by a shaft 58 to a pair of flanges 60 secured to the beam 34. Thus, by extending the length of the turnbuckle the beam 34 is rotated clockwise about the axis of its pivot bolt 36 (FIG. 2) to increase its angular disposition relative to the shaft 22.

The tie rods 54 also are secured pivotally to the plates 28, as by pivot pin 62. Accordingly, as the beam 34 is pivoted, by operation of the turnbuckle, the mounting flange plates 48 are rotated on their pivot bolts 50 to maintain the mounting flanges 44 parallel with the fixed mounting flanges 44a on the plates 28. However, the lateral spacing between adjacent pairs of flanges, and hence the land sides L of adjacent plow bottoms, is varied as the beam is pivoted.

The roll-over mechanism for rotating the plow bottoms to one side or the other of the longitudinal axis of the sleeve 24, for right or left hand plowing, is illustrated as comprising an extensible hydraulic fluid pressure cylinder 64. It is connected pivotally at its outer end, as by pivot shaft 66, to an extension of the outer end wall 32. The inner end of the cylinder is connected, as by pivot shaft 68, to angle flange 70 from the flange 20.

Referring to FIG. 3 of the drawings, rolling the plow assembly over from the illustrated right hand operative position to the left hand position, is achieved by supplying hydraulic fluid under pressure to the inner, or right hand end of the roll-over cylinder 64 to effect its contraction in length. The assembly of plates 28 and plow beam 34 thus is rotated clockwise about the longitudinal axis of the shaft 22 and sleeve 24 to the intermediate, vertical position illustrated in broken lines. The inertia of the mass of the rotating assembly carries it further clockwise from the vertical position, whereupon application of hydraulic fluid under pressure to the top, or left hand end of the cylinder 64 causes it to extend in length and rotate the assembly further clockwise to the full left hand operative position.

Abutments 72 are extended rearwardly from the opposite ends of the beam 10 to serve as stops for the plates 28 in the right hand and left hand operating positions of the assembly.

Figure 4:
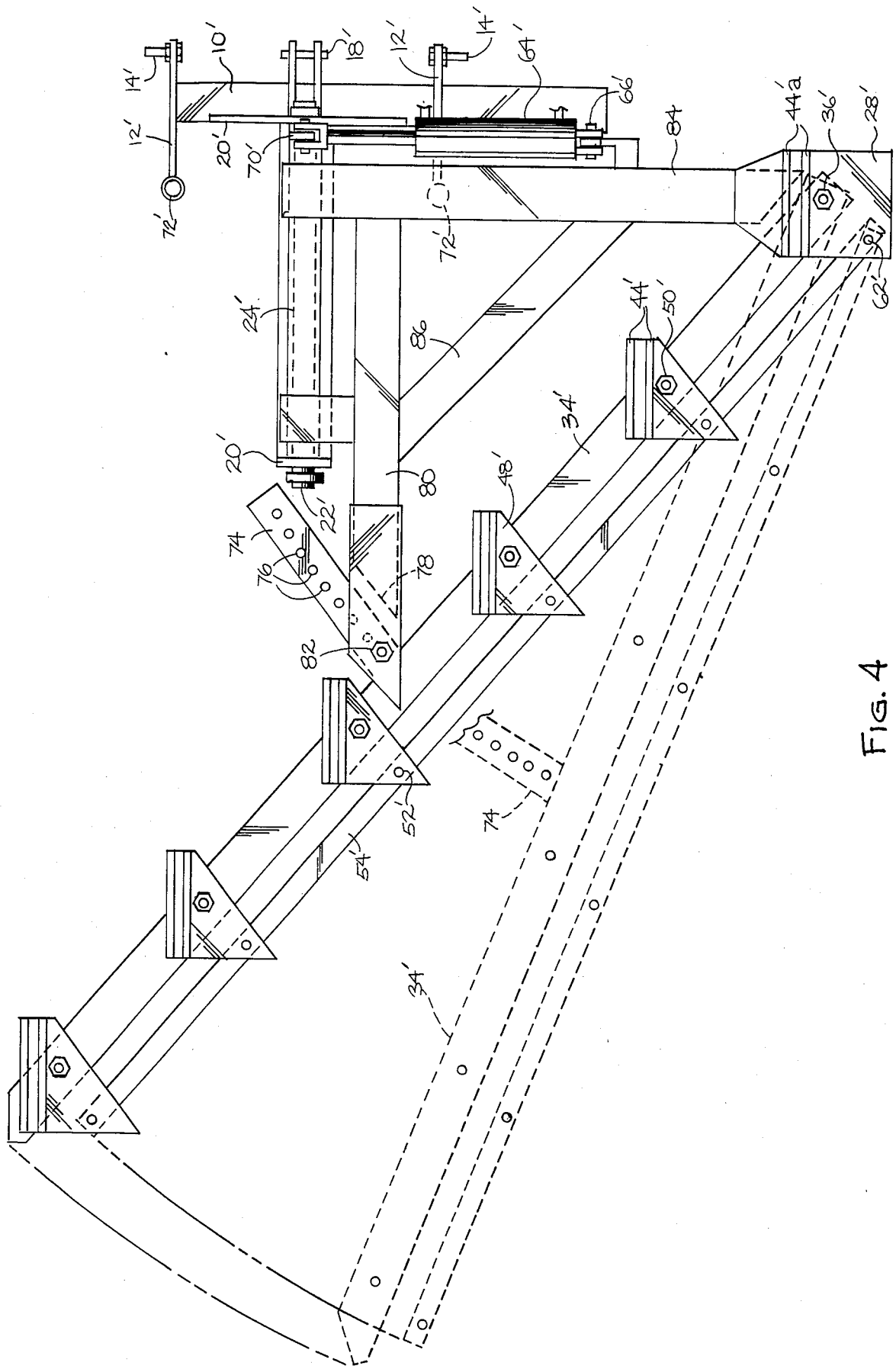
FIG. 4 is a plan view of a second embodiment of a plow assembly structure embodying features of this invention.

In the embodiment illustrated in FIG. 4, the turnbuckle 56 previously described for adjusting the angular disposition of the plow beam 34 is replaced by an arcuately elongated bar 74 secured to and extending from the beam 34′. The bar is provided with a plurality of longitudinally spaced index holes 76. The bar extends freely through a slot 78 in a guide beam 80. An opening in the guide beam is arranged to register with each index hole 76 selectively, for reception of a locking bolt 82 by which to secure the plow support beam 34′ in desired angular relationship with respect to the axis of the sleeve 24′.

The embodiment of FIG. 4 also differs from the first described embodiment in substituting the rollover beam 84 with attached guide beam 80 and brace 86 for a portion of the plates 28 of FIG. 2. Also, the roll-over cylinder 64′ is connected pivotally between the angle flange 70′ and the beam 84.

It will be apparent to those skilled in the art that various changes may be made in the size, shape, type, number and arrangement of parts described hereinbefore without departing from the spirit of this invention and the scope of the appended claims.

Having thus described my invention and the manner in which it may be used, I claim:

1. A two-way gang plow comprising:
   (a) a main frame having horizontal axis pivot means for attachment to a tractor,
   (b) a plow bottom frame support mounted on the main frame for rotation about the longitudinal axis of the main frame,
   (c) power means interconnecting the main frame and the plow bottom frame support for rotating the latter,
   (d) a pair of plow bottom attachment members secured in fixed position to the plow bottom frame support,
   (e) a plow bottom secured detachably to each of said fixed plow bottom attachment members, the latter being positioned to dispose the plane of the land sides of the associated plow bottoms substantially parallel to the longitudinal axis of the main frame,
   (f) an elongated plow bottom support frame supported adjacent its forward end by the plow bottom frame support for pivotal movement about a vertical axis displaced laterally from the longitudinal axis of the main frame for adjusting the angular disposition of the plow bottom support frame relative to the longitudinal axis of the main frame,
   (g) adjustment means interengaging the plow bottom frame support and the plow bottom support frame for adjusting the latter relative to the longitudinal axis of the main frame,
   (h) a plurality of pairs of plow bottom attachment members disposed at longitudinally spaced intervals along the length of the plow bottom support frame,
   (i) a plow bottom secured detachably to each plow bottom attachment member, each plow bottom having a land side,
   (j) pivot means securing each pair of plow bottom attachment members to the plow bottom support frame for pivotal movement about an axis extending parallel to the plane of the land sides of the associated plow bottoms, and
   (k) a tie rod member pivotally interconnecting all of the pivoted plow bottom attachment members and secured pivotally adjacent its forward end to the plow bottom frame support for pivoting all said pivoted attachment members simultaneously and to the same degree for maintaining the planes of the land sides substantially parallel to the longitudinal axis of the main frame.

2. The two-way gang plow of claim 1 wherein the horizontal axis pivot means includes connector means on the main frame for releasable attachment to a three-point hitch of a tractor.

3. The two-way gang plow of claim 1 wherein the adjustment means comprises a turnbuckle.

4. The two-way gang plow of claim 1 wherein the adjustment means comprises a guide member secured to the plow bottom frame support, and elongated arm secured to the plow bottom support frame and movable with the latter relative to the guide member, and securing means releasably interconnecting the guide member and arm for securing the plow bottom support frame in desired position of angular adjustment relative to the longitudinal axis of the main frame.

5. The two-way gang plow of claim 1 including lock means releasably interengaging the plow bottom frame support and plow bottom support frame for securing the latter in adjusted position.

* * * * *